(12) United States Patent
Müller et al.

(10) Patent No.: US 6,206,158 B1
(45) Date of Patent: Mar. 27, 2001

(54) WEAR INDICATOR FOR FRICTION CLUTCHES

(75) Inventors: Roland Müller, Geldersheim; Marco Greubel, Niederwern; Erwin Ziegler, Gressthal; Frank Hirschmann, Niederwern, all of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/356,945

(22) Filed: Jul. 19, 1999

(30) Foreign Application Priority Data

Jul. 17, 1998 (DE) ............................................. 198 32 134

(51) Int. Cl.$^7$ ..................................................... F16D 13/60
(52) U.S. Cl. .................................. 192/30 W; 192/70.18; 116/208
(58) Field of Search ............................. 192/30 W, 70.18; 188/1.11 W; 116/208; 340/454

(56) References Cited

U.S. PATENT DOCUMENTS

| 3,701,401 | * | 10/1972 | Palma et al. | 192/30 W |
| 4,567,972 | * | 2/1986 | Buch et al. | 192/30 W |
| 5,238,093 | * | 8/1993 | Campbell | 192/30 W |
| 5,531,308 | * | 7/1996 | Gochenour et al. | 192/30 W |

FOREIGN PATENT DOCUMENTS

| 26 40 088 | 3/1978 | (DE) . |
| 29 16 807 | 12/1980 | (DE) . |
| 197 14 775 | 10/1998 | (DE) . |
| 55-126127 | * 9/1980 | (JP) ................................... 192/30 W |

* cited by examiner

*Primary Examiner*—Richard M. Lorence
(74) *Attorney, Agent, or Firm*—Cohen, Pontani, Lieberman & Pavane

(57) ABSTRACT

A device for a clutch which is subject to wear brought about by friction, especially for motor vehicles, for signaling that a wear limit has been reached. The clutch has a pressure plate which is connected, via tangential leaf springs, with a clutch housing so as to be fixed with respect to rotation relative to it, but so as to be axially displaceable, and by way of which a clutch disk provided with friction linings can be pressed against a flywheel of an internal combustion engine. The device has two structural component parts which can be clamped against one another, one of which structural component parts is arranged so as to be movable in the radial direction. A clamping of the structural component parts can be canceled when the wear limit is reached, wherein a movable structural component part springs into another radial position and remains there.

14 Claims, 6 Drawing Sheets

Fig.4
Fig.5
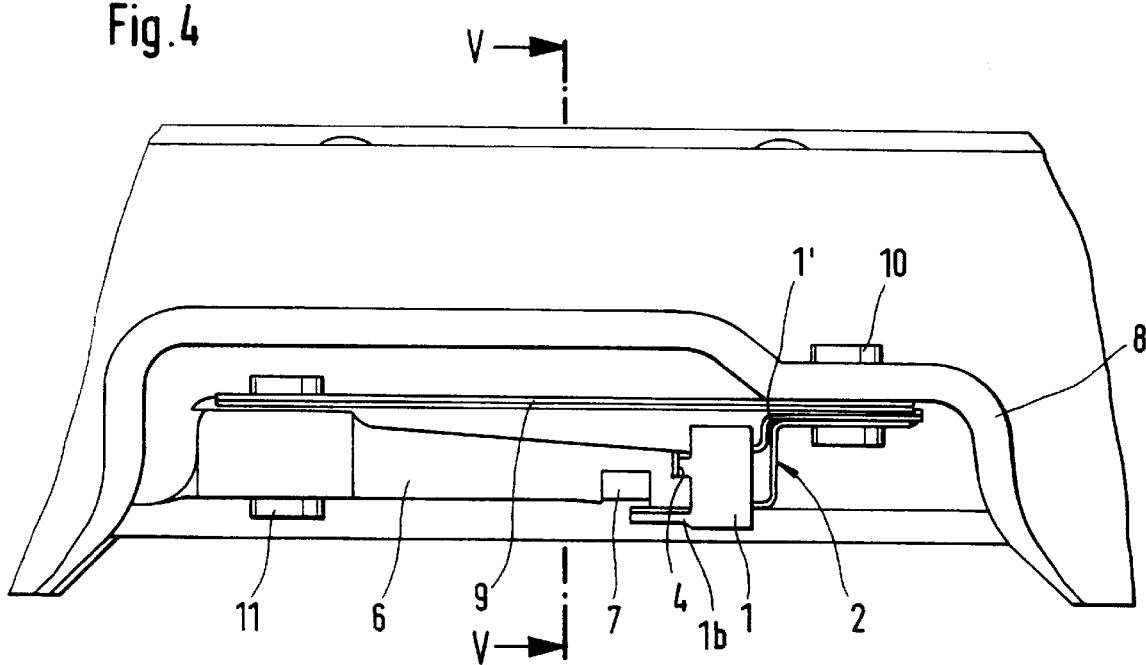
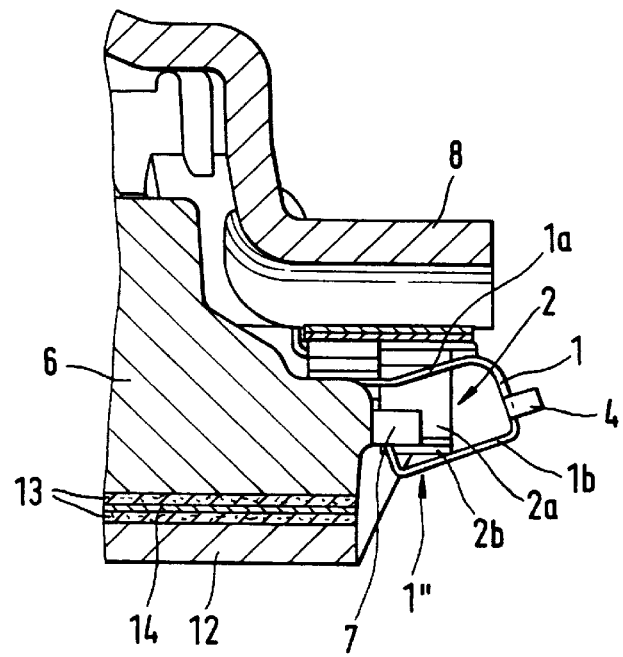

WEAR INDICATOR FOR FRICTION CLUTCHES

SUMMARY OF THE INVENTION

1. Field of the Invention

The invention is directed to a device for a clutch which is subject to wear brought about by friction, especially for motor vehicles, for signaling that a wear limit has been reached. The clutch has a pressure plate which is connected, via tangential leaf springs, with a clutch housing so as to be fixed with respect to rotation relative to the clutch housing, but so as to be axially displaceable, and by means of which pressure plate a clutch disk provided with friction linings can be pressed against a flywheel of an internal combustion engine or the like.

2. Discussion of the Prior Art

German reference DE 26 40 088 A1 discloses a device for determining abrasion in a clutch disk lining in which the axial position of the thrust plate is detected by a sensor. For this purpose, there is affixed to the thrust plate a marking which is formed of two marks adjoining one another in the circumferential direction of the thrust plate and extending in the axial direction of the clutch and a third mark connecting the front end of one mark with the rear end of the other mark so that the marking has a Z-shape. An inductive sensor is inserted into an opening of the clutch housing. The sensor and the marking are oriented relative to one another in such a way that the effective direction of the sensor covers a center line of the Z-shaped marking when the clutch is engaged and the friction lining is new. An evaluating unit having a display unit is connected with the sensor. The wear of the friction linings is determined in a continuous manner with this complex device.

German reference DE 29 16 807 A1 discloses a distance sensing device for a friction clutch in which pins supported against a pressure spring are inserted in the flywheel of the internal combustion engine. The movement of a pin is transmitted, via a lever, to a ring which is movable in the axial direction and which cooperates with a proximity switch arranged in a stationary manner in the clutch housing. When the clutch is closed, the pins are pressed by the clutch disk into the flywheel against the force of the pressure spring. This distance sensing device is used, especially in trucks, for detecting the exact cutoff point or action point when closing the clutch in order to reduce the shifting times of the pneumatically actuated clutch, because the clutch can be further actuated quickly initially and then slowly after contact for engagement of the clutch. Wear of the friction lining of the clutch disk can only be taken into account by these sensors during engagement of the clutch but cannot be determined.

It is also known to take a reading of lining wear by means of marks on the actuating system. A path measurement is also carried out by means of a moving coil at the concentric slave cylinder.

In view of the extended warranty periods aimed for by vehicle manufacturers, it is desirable to have a device for determining lining wear in a clutch so that the clutch disk can be exchanged in a timely manner without the need for periodic visual inspection. In this way, friction lining wear can be continuously determined, monitored and displayed. It is also possible to detect only the limit of maximum permissible lining wear, which limit, when reached, is displayed via a signal device.

Realization of systems in which wear of the friction linings is continuously determined and displayed is very costly. In order to prevent errors, a complicated electronic circuit is needed. Such devices are not only expensive, but also prone to malfunction.

The path or distance marks on the actuating system are read at intervals during maintenance. The path of an actuating element is indicated. Tolerances and play between the worn lining and this actuating element or the indicator cannot be eliminated and consequently undermine the results, which in the worst possible case can lead to the mark remaining in the positive range when the maximum permissible wear has already occurred or is immediately impending.

The path of the clutch release bearing or throwout bearing, and not the lining wear directly, is determined by the moving coil at the concentric slave cylinder. However, the path of the throwout bearing is influenced by temperature variations. Consequently, the measurements are not exact. Moreover, the axial play as well as the wobble impact of the flywheel falsify measurement.

SUMMARY OF THE INVENTION

Proceeding from this statement of the problem, it is an object of the present invention to provide a device which can signal that a maximum permissible wear limit of the friction linings has been reached without the disadvantages of the known devices mentioned above.

Pursuant to this object, and others which will become apparent hereafter, one aspect of the present invention resides in a device of the type mentioned above having two structural component parts which can be braced or clamped against one another, one of which structural component parts is arranged so as to be movable in the radial direction and the clamping can be canceled when a wear limit is reached. Preferably, the clamping can be cancelled through force acting on one of the structural component parts which springs the movable structural component part into another radial position and the movable structural component remains there.

As a result of this construction, when the wear limit is reached, the movable structural component part occupies a different radial position which can be detected. Detection can be carried out optically or electrically via a sensor. It is also possible that the structural component part swings away, severs a thread, wire or the like and triggers a signal to the driver of the vehicle which indicates that the wear limit has been reached.

Due to the fact that only a few structural component parts are needed which are not exposed to wear for the life of the clutch since a relative movement is only possible when the friction linings are worn, the device according to the invention is very simple and accordingly inexpensive to build. Further, due to the fact that the clamping must be disengaged mechanically, the functioning of this device is extremely dependable.

With the device according to the invention, axial and radial play and wobbling of a flywheel have no effect on the releasing of the movable structural component part. Also, due to the purely mechanical construction without the intermediary of additional structural component parts, temperature is not expected to influence signaling. No adjustment is necessary when assembling. The lining wear is measured directly. Furthermore, the device requires no maintenance and displays only two states (good or bad).

The structural component parts which can be clamped against one another can be fastened to a pressure plate or to a clutch housing.

One structural component part is preferably a spring clip with a finger which projects in the direction of the flywheel and which has a projection or a flag extending essentially vertical to the finger. When the wear limit is reached, the finger runs against the flywheel so that the clamping relative to the other structural component part is canceled, the clip springs back and the resulting changed radial position of the flag can be detected. The cancellation of the clamping need not be carried out in a sudden manner, but can be introduced gradually by a (radial) displacing movement of the finger.

The two structural component parts can be connected with the pressure plate or with the housing via a fastening rivet for the tangential leaf springs.

In another embodiment, it is also possible for one structural component part to be a spring clip with a free end in the direction of the pressure plate, this free end being clamped against the other structural component part. The spring clip has a flag and the pressure plate is provided with an axial projection which stops against the free end and, when the wear limit is reached, the clamping relative to the other structural component part is canceled, the clip springs back and the resulting changed radial position of the flag can be detected. The stationary structural component part is preferably Z-shaped in cross section with two legs extending parallel to the tangential leaf spring.

The movable structural component part preferably has three legs which are bent at an angle of 90° relative to one another, one of which legs forms the finger and another leg, which forms the flag, is provided which projects essentially at a right angle from the leg forming the finger. The leg forming the finger can be clamped against the leg of the stationary structural component part on the flywheel side.

In another embodiment, the movable structural component part can also have a substantially U-shaped cross section, wherein the leg remote of the flywheel is bent at its end by essentially 90° and continues parallel to the tangential leaf spring, the leg of the stationary structural component part on the flywheel side is provided between the two legs of the movable structural component part and the legs of both structural component parts on the flywheel side can be clamped relative to one another.

In a third embodiment of the invention, the pressure plate can have a radial projection with a radial bore hole in which a spring-loaded pin or the like is arranged. A plate, which is fixed with respect to the housing, covers the bore hole receiving the pin. When the wear limit is reached, the plate uncovers the bore hole and the changed radial position of the pin springing out of the bore hole is detectable.

The flag or pin can be detected via sensors (for example, light barriers, inductive sensors or Hall sensors) which are arranged in a stationary manner in the clutch case surrounding the clutch housing.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 3c shows a view according to line IIIc in FIG. 3a;

FIG. 4 shows another embodiment in a view corresponding to FIG. 1;

FIG. 5 shows a section along plane V—V according to FIG. 4;

DETAILED DESCRIPTION OF THE PREFERRED EMBODIMENTS

Figure 1:
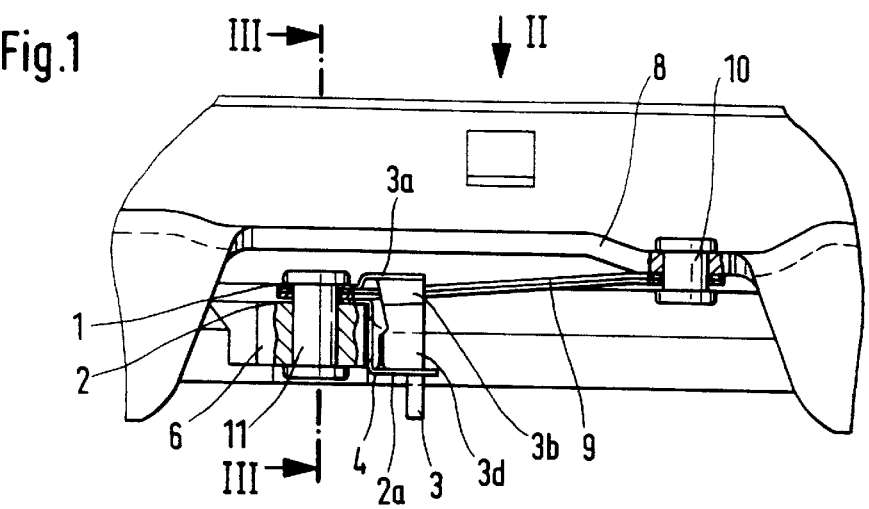
FIG. 1 shows a radial partial section of a friction clutch in simplified view.
Figure 2:
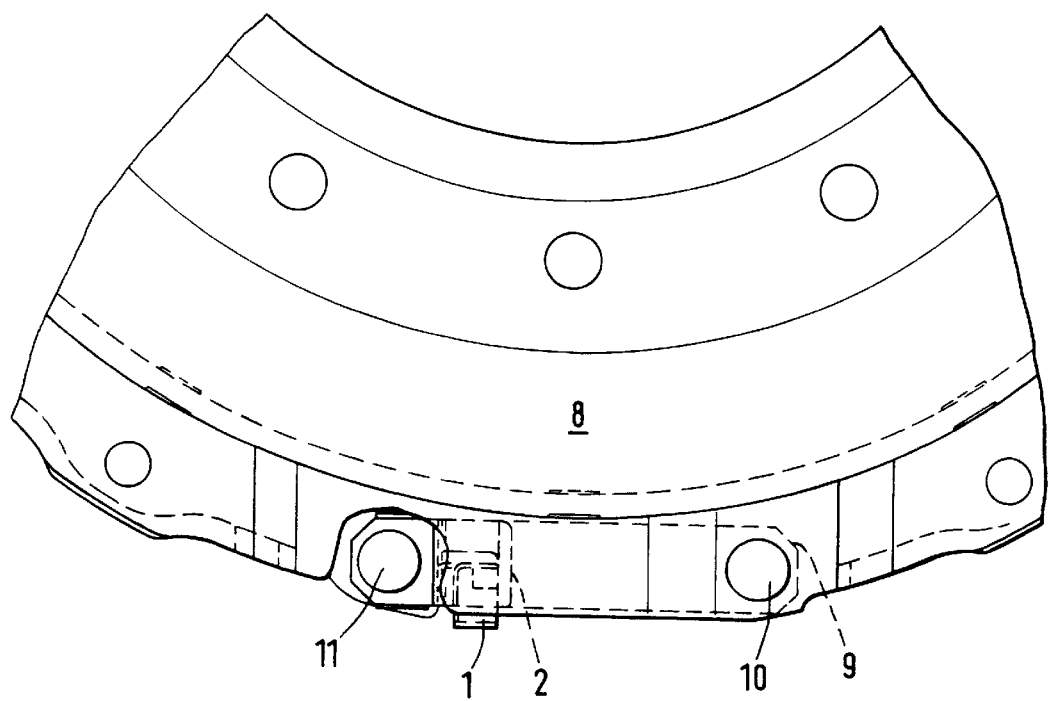
FIG. 2 shows a partial view according to arrow II in FIG. 1.
Figure 3:
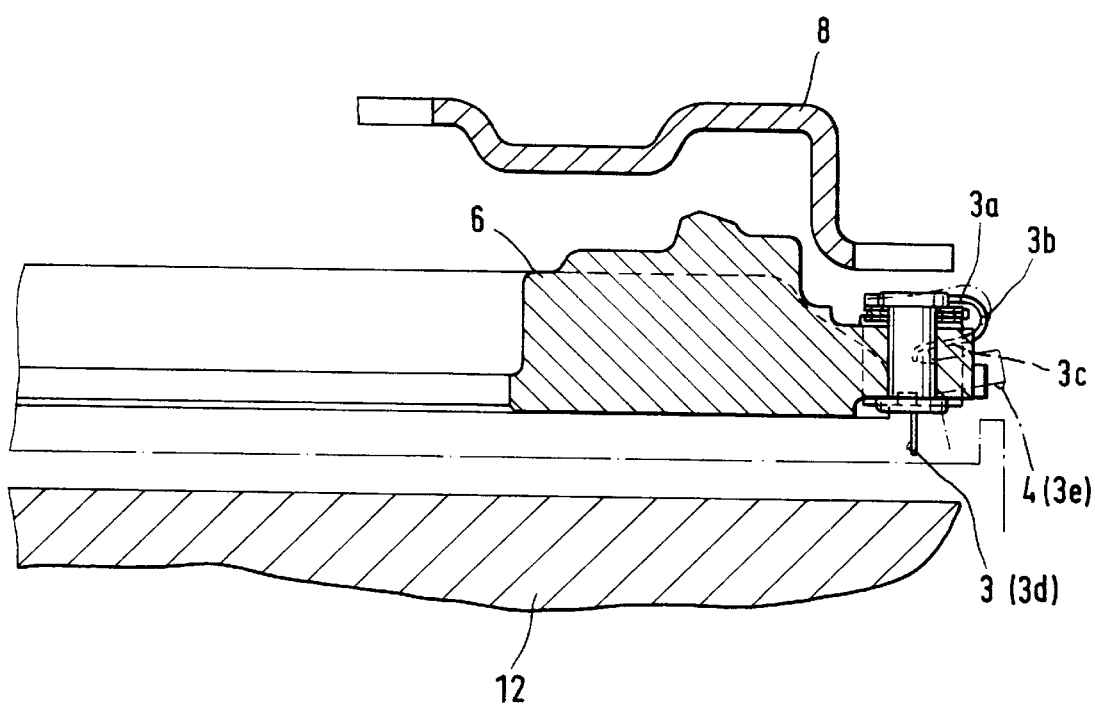
FIG. 3 shows the section along plane III—III in FIG. 1.
Figure 3A:
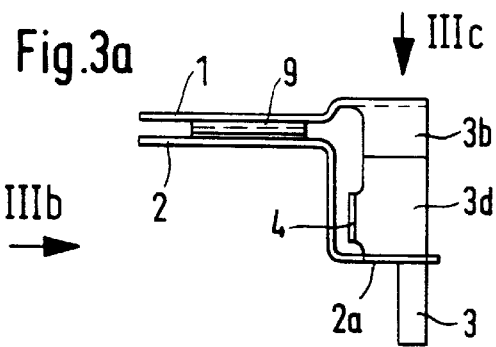
FIG. 3a shows an enlarged view of the device constructed according to the invention from FIG. 3.
Figure 3B:
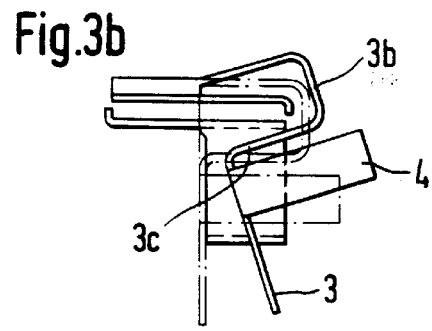
FIG. 3b shows a view according to arrow IIIb in FIG. 3a in a rest position (broken lines) and in swiveled out position (solid lines)
Figure 3C:
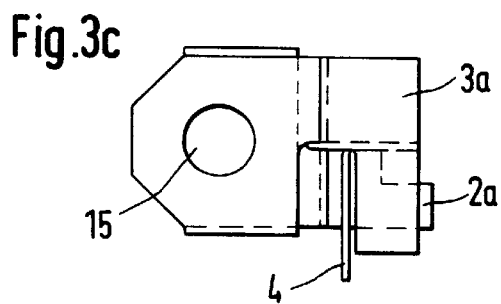
Figure 3D:
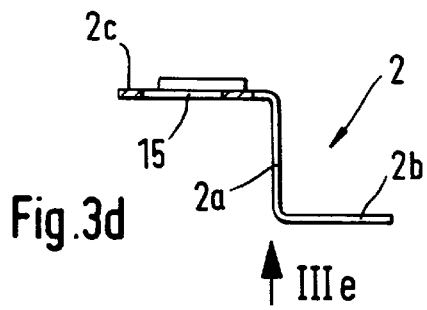
FIG. 3d shows a side view of the stationary structural component part.
Figure 3E:
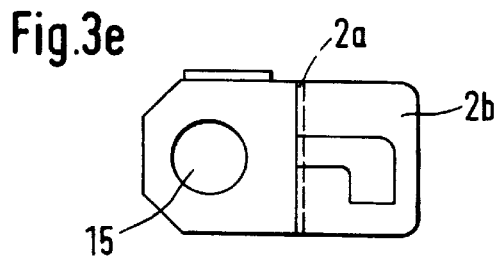
FIG. 3e shows a view according to arrow IIIe in FIG. 3d.
Figure 3F:
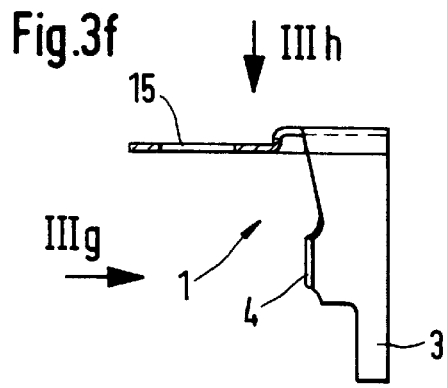
FIG. 3f shows a view of the spring clip.
Figure 3G:
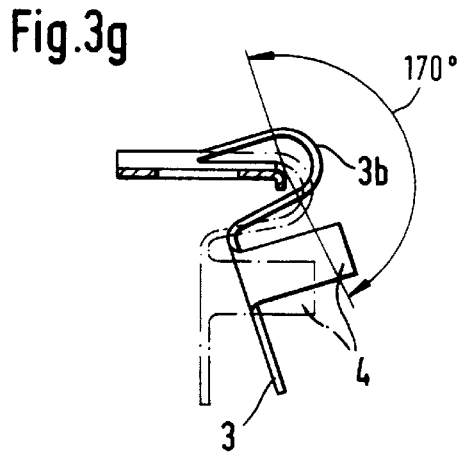
FIG. 3g shows a view according to arrow IIIg in FIG. 3f.
Figure 3H:
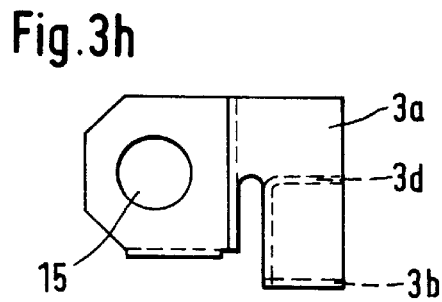
FIG. 3h shows a view according to arrow IIIh in FIG. 3f.
Figure 6:
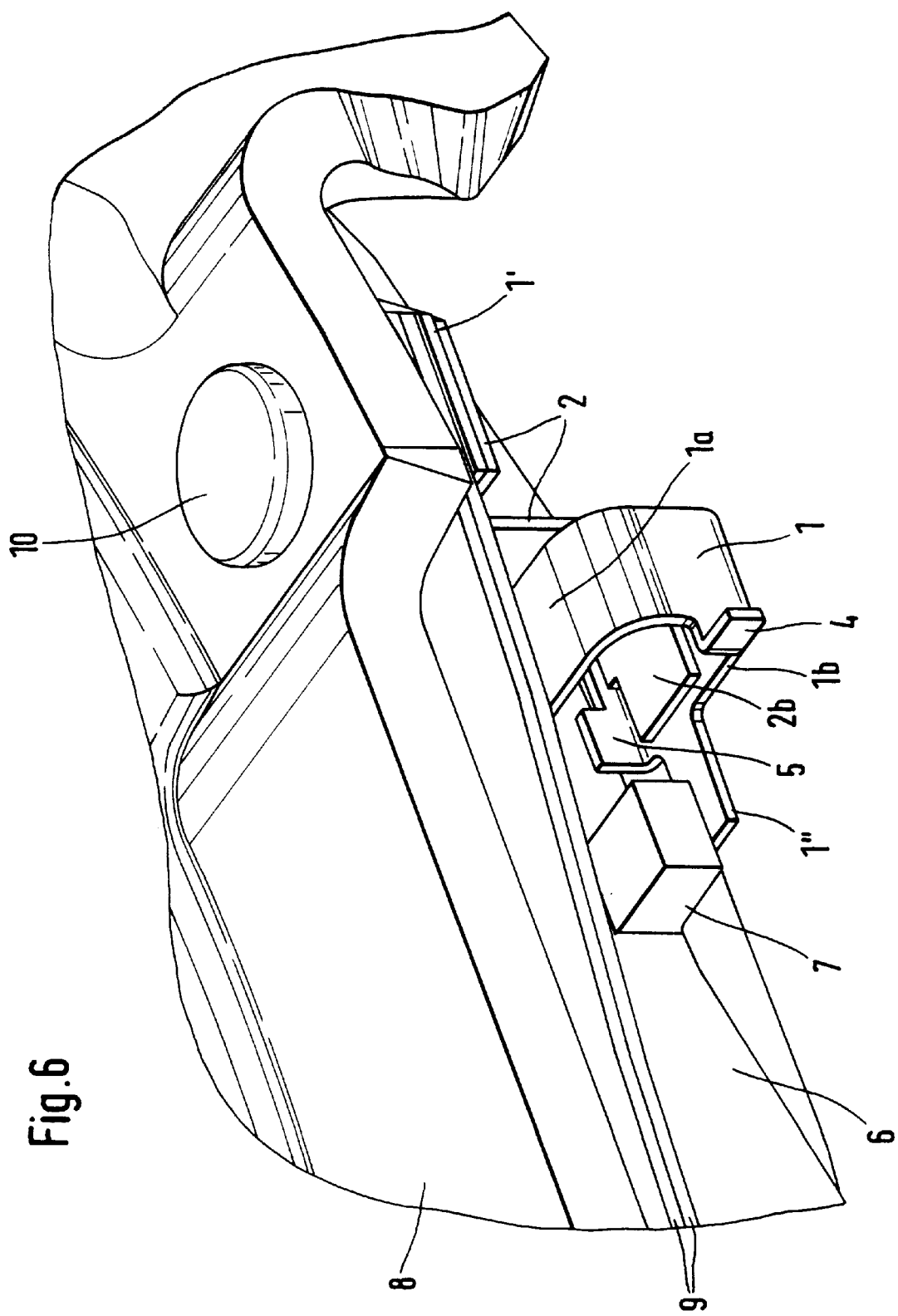
FIG. 6 shows a perspective view of the device shown in FIG. 4 with structural component parts clamped relative to one another.
Figure 7:
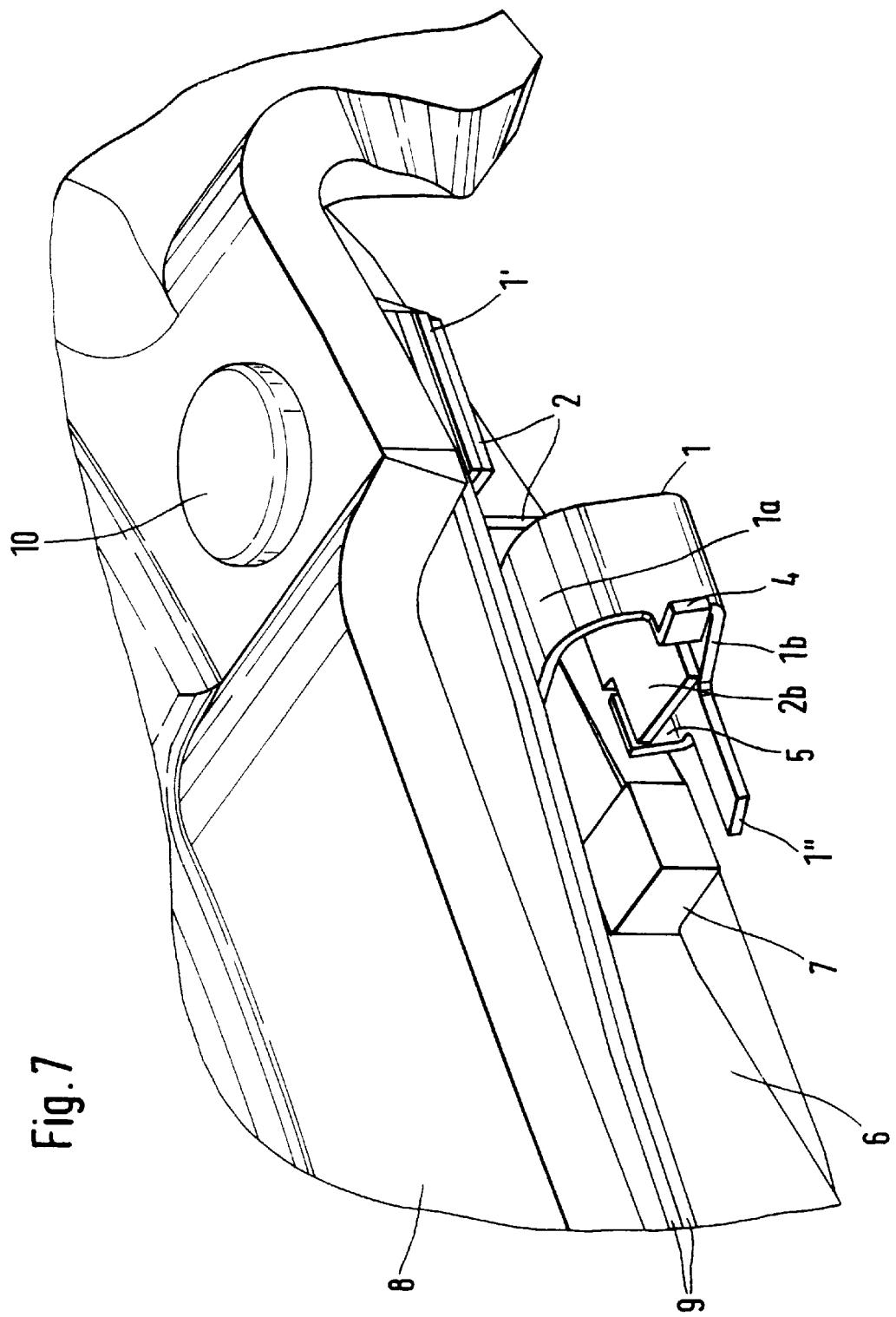
FIG. 7 shows a view according to FIG. 6 with the spring clip in a swiveled state.

A first embodiment is shown in FIGS. 1 to 3h. The other embodiments are shown in FIGS. 4 to 7. Structural component parts having the same function are identified by the same reference numbers.

The pressure plate 6 is connected with the clutch housing 8 via tangential leaf springs 9 so as to be fixed with respect to rotation relative to it but so as to be movable in the axial direction. The clutch disk 14 which is provided with friction linings 13 on both sides is pressed by the pressure plate 6 onto a flywheel 12 connected with the crankshaft of an internal combustion engine, not shown in more detail. The tangential leaf springs 9 are connected with the pressure plate 6 and the clutch housing 8 via rivets 10, 11.

As is shown in FIG. 1, the device is formed of a movable structural component part 1 and a stationary structural component part 2 and is connected to the pressure plate 6 by a bore hole 15 and a rivet 11. The stationary structural component part 2 is a sheet metal bracket or clip with a substantially Z-shaped cross section, wherein two legs extend substantially parallel to the tangential leaf spring 9. The movable structural component part 1 is a spring clip with four legs 3a, 3b, 3c, 3d which adjoin one another in each instance at an angle of about 90°. The last leg 3d forms a finger 3 which projects in the axial direction toward the flywheel 12 (compare FIG. 3). Another bent leg 3e which faces in the radial direction and forms a flag 4 is provided at leg 3d. For purposes of clamping the spring clip 1, the lower leg 3d is clamped against a flywheel-side leg 2a of the Z-shaped stationary structural component part 2. The flag 4 takes a fixed circular path with respect to its radial position. The finger 3 lies radially outside of the friction lining 13 and projects over the latter in the direction of the flywheel 12. An axial distance which corresponds to the maximum permissible friction lining wear is provided between the friction lining 13 facing the flywheel 12 and the end of the finger 3.

As wear of the friction linings 13 increases, the pressure plate 6 moves farther in the direction of the flywheel 12. When the wear limit is reached, the finger 3 abuts against the flywheel 12 and is bent by the latter in such a way that the leg 3d disengages from the leg 2a of the stationary structural component part and the spring clip 1 springs into its relaxed position, so that the flag 4 occupies a different radial position. This altered radial position can be detected by suitable sensors, not shown in more detail, which are fastened to the clutch casing, not shown. A signal for the wear limit that has been reached can then be generated and indicated to the driver of the vehicle. It is also possible that no additional sensors are provided and that, rather, the flag 4 swiveling away severs a thread or wire, so that a signal is immediately triggered.

The finger 3 can also be constructed so that it already contacts the flywheel 12 when the friction linings 13 are new and is deflected from its position in a radial direction along the wear path so that the spring clip 1 is released from the stationary structural component part 2 until the clamping is canceled when the wear limit is reached. Accordingly, there is a constant change in the position of the finger 3 over the wear path of the friction linings 13.

In the embodiments shown in FIGS. 4 to 7, the movable structural component part 1 and the stationary structural component part 2 are fastened to the housing 8 via the fastening rivet 10 for the tangential leaf spring 9. The stationary structural component part 2 is again Z-shaped in cross section. The movable structural component part 1 is a spring clip which has a substantially U-shaped cross section with two legs 1a, 1b. The end 1' of the leg 1a on the housing side extends at an angle and parallel to the tangential leaf spring 9. The flywheel-side leg 2b of the structural component part 2 is arranged between the two legs 1a, 1b of the spring clip 1. A flag 4 which projects out radially is formed on at the leg connecting the two legs 1a, 1b. The pressure plate 6 is provided with a radial projection 7 which faces the structural component parts 1, 2.

In order to clamp the spring clip 1, the edge 5 of the free end 1" of the flywheel-side leg 1b, which edge 5 is bent in the direction of the other leg 1a and located on the radial inside, is displaced behind the leg 2b of the stationary structural component part 2, where it locks in a springing manner in this position. The axial distance between the projection 7 and the edge of the end (1") associated therewith corresponds to the maximum permissible lining wear.

As the wear of the linings 13 increases, the pressure plate 6 moves farther in the axial direction to the flywheel 12. The projection 7 comes into contact with the free end 1" of the leg 1b of the spring clip 1 and bends it. The edge 5 moves farther and farther away from the leg 2b. When the maximum wear path is reached, the leg 1b disengages from the leg 2b and the spring clip 1 swivels in the direction of the clutch housing 8 (compare FIG. 7). The flag 4 occupies a different radial position which can be detected in the manner already described above.

In this embodiment also, the device can be constructed in such a way that the projection 7 of the pressure plate 6 already contacts the free end 1" of the leg 1b when the friction linings 13 are new and a continuous change in radial position of the spring clip takes place due to the occurring wear until this spring clip springs out of contact with the leg 2b of the stationary structural component part (holding plate) when the maximum wear path is reached.

Further modifications, not shown, are also possible. For example, a spring-loaded pin which is covered radially by a structural component part 2 which is fixed with respect to the housing could be accommodated in a radial bore hole provided in the projection 7. When the pressure plate 6 moves in the direction of the flywheel 7, the structural component part 2 which is fixed with respect to the housing disengages from the spring-loaded pin and the pin springs out in the radial direction and its altered radial position can be detected.

The invention is not limited by the embodiments described above which are presented as examples only but can be modified in various ways within the scope of protection defined by the appended patent claims.

We claim:

1. A device for a clutch, which wears due to friction, for signaling that a wear limit has been reached, comprising:

a pressure plate;

a clutch housing;

tangential leaf springs that connect said pressure plate to said clutch housing so that said pressure plate is axially displaceable and fixed with respect to rotation relative to said clutch housing;

two sheet metal structural component parts that can be clamped against one another, one of said structural component parts being movable in a radial direction, clamping of the parts being cancelled when said wear limit is reached so that said movable structural component part springs into a new radial position and remains in said new radial position; and rivets arranged to connect the tangential leaf springs to the clutch housing and the pressure plate, one of the rivets also fastening the two structural component parts to one of the pressure plate and the clutch housing.

2. A device for a clutch as defined in claim 1, wherein said clamping between said structural component parts can be canceled by a force acting on one of said structural component parts.

3. A device for a clutch as defined in claim 2, wherein said structural component parts are fastened to said pressure plate.

4. A device for a clutch as defined in claim 2, wherein said structural component parts are fastened to said clutch housing.

5. A device for a clutch as defined in claim 1, wherein one of said structural component parts is a spring clip having a finger and a flag, said finger projects toward a flywheel and said flag extends essentially perpendicular to said finger, said finger being configured to run against the flywheel when the wear limit is reached so that said clamping cancels, said clip springs back and said resulting radial position of said flag can be detected.

6. A device for a clutch as defined in claim 5, wherein said stationary structural component part is Z-shaped in cross section and has two legs, including a first leg and a second leg, which extend essentially parallel to said tangential leaf spring.

7. A device for a clutch as defined in claim 6, wherein said movable structural component part has four legs including a first leg, a second leg, a third leg and a fourth leg, which bend at an angle of 90° relative to each another, said third leg forming said finger and said fourth leg forming said flag, said fourth leg projecting essentially at a right angle from said third leg.

8. A device for a clutch as defined in claim 7, wherein said third leg of said movable structural component part clamps against said second leg of said stationary structural component part on a side facing a flywheel.

9. A device for a clutch as defined in claim 1, wherein one of said structural component parts is a spring clip having a free end and a flag, said free end extends toward said pressure plate and is clamped against another of said structural component parts which is stationary, said pressure plate having a radial projection which stops against said free end so that when said wear limit is reached, said clamping cancels, said spring clip springs back and a resulting changed radial position of said flag is detected.

10. A device for a clutch as defined in claim 9, wherein said stationary structural component part is Z-shaped in cross section and has two legs, including a first leg and a second leg, which extend essentially parallel to said tangential leaf spring.

11. A device for a clutch as defined in claim 10, wherein said movable structural component part has four legs including a first leg, a second leg, a third leg, and a fourth leg, which bend at an angle of 90° relative to each another, said third leg forming said finger and said fourth leg forming said flag, said fourth leg projecting essentially at a right angle from said third leg.

12. A device for a clutch as defined in claim 11, wherein said third leg of said movable structural component part clamps against said second leg of said stationary structural component part on a side facing a flywheel.

13. A device for a clutch as defined in claim 1, wherein said movable structural component part is U-shaped in cross section and has a first leg and a second leg, said first leg being remote of a flywheel and having an end that is bent by essentially 90° and continues parallel to said tangential leaf spring, said of said stationary structural component part having a leg on a flywheel side that is arranged between said first and said second legs of said movable structural component part and said second leg of said movable structural component part and said leg of said stationary structural component part on said flywheel side are clamped against one another. said bore hole, and a plate which is fixed with respect to said housing and covers said bore hole receiving said pin, said plate being moveable to uncover said bore hole when said wear limit is reached, so that said pin springs out of said bore hole and is detectable.

14. A friction clutch, comprising:

a clutch case;

a pressure plate;

a clutch housing;

tangential leaf springs that connect said pressure plate to said clutch housing so that said pressure plate is axially displaceable and fixed with respect to rotation relative to said clutch housing;

two sheet metal structural component parts that can be clamped against one another, one of said structural component parts being movable in a radial direction, clamping of the parts being cancelled when said wear limit is reached so that said movable structural component part springs into a new radial position and remains in said new radial position, one of said moveable structural component part is a spring clip having a finger and a flag, said finger projects toward a flywheel and said flag extends essentially perpendicular to said finger, said finger being configured to run against the flywheel when the wear limit is reached so that said clamping cancels, said clip springs back and said resulting radial position of said flag can be detected;

rivets arranged to connect the tangential leaf springs to the clutch housing and the pressure plate, one of the rivets also fastening the two structural component parts to one of the pressure plate and the clutch housing; and a sensor arranged inside of said clutch case for detecting said flag.

* * * * *